July 15, 1947.  F. B. HALFORD  2,423,973

SHAFT BEARING

Filed Aug. 31, 1943

Inventor
Frank Bernard Halford
By
Loyd Hull Sutton
Attorney

Patented July 15, 1947

2,423,973

UNITED STATES PATENT OFFICE 2,423,973

SHAFT BEARING

Frank Bernard Halford, Edgware, England, assignor to The De Havilland Aircraft Company Limited, Edgware, England, a company of Great Britain Application August 31, 1943, Serial No. 500,698
In Great Britain September 9, 1942

8 Claims. (Cl. 308—35)

This invention relates to shaft bearings and particularly for the shaft which extends between a compressor and the turbine by which this compressor is driven, the bearing being of the type in which an anti-friction bearing is not mounted directly on the shaft, but on a separate sleeve which surrounds and is connected to, but has the minimum area of contact with the shaft. This bearing lies on a part of this sleeve which is clear of the shaft within it and has such flexibility that expansion of the sleeve due to heat will not distort the bearing. Cooling air can flow to the bearing housing and thence between the sleeve, which may be called the shaft sleeve, and the shaft within it, this air flowing also between the housing and an outer sleeve which supports the bearing externally. The cooling air passes from the bearing to the turbine at the end of the shaft beyond the bearing.

In the above known arrangement the anti-friction bearing may be insufficiently supported externally to prevent tilting and further the cooling air can have such access to the anti-friction bearing that dust tends to be carried into this bearing causing wear and moreover the air may blow the lubricating oil from the bearing. These disadvantages are avoided in the present improved construction.

According to this invention in a bearing of the general type and for the purpose above indicated safety bearing surfaces are provided on each side of the anti-friction bearing, these surfaces which are carried by non-rotating parts enclosing the bearing lying near the surface of the sleeve which surrounds and is connected to the driving shaft. The outer race of the anti-friction bearing is mounted in a tubular member which can slide but not rotate in a non-rotating outer sleeve which carries the safety bearing surfaces and with the tubular member gives support in the axial direction to the outer race and thus prevents tilting of the anti-friction bearing. The safety bearing surfaces are constituted by parts faced with lead-bronze or other suitable bearing material. These linings may be directly fixed on the parts which carry them, or alternatively the bearing material may be arranged as steel-backed shells which can be inserted in the desired places.

The improved bearing structure may comprise in combination a hollow shaft connected to the turbine as a source of power, a sleeve through which the power from the turbine is transmitted to the impeller of a compressor, this sleeve surrounding the hollow shaft with a clearance between them while the sleeve and shaft are connected by splines, the inner race of an anti-friction bearing carried by this sleeve, a fixed part enclosing the bearing and having within it and connected to it a sleeve which carries a safety bearing surface situated at one side of the anti-friction bearing and near the surface of the rotating sleeve, an annular housing which is connected to the fixed sleeve and lies at the other side of the anti-friction bearing, this housing carrying one or more safety bearing surfaces situated near the surface of the rotating sleeve, and a tubular member which carries the outer race of the anti-friction bearing and being free to slide in the axial direction within the fixed sleeve is connected to and held against rotation by the annular housing.

The safety bearing surfaces serve to keep the cooling air from carrying dust into the anti-friction bearing and they also form in effect glands to prevent leakage of lubricating oil.

The accompanying drawing illustrates by way of example a construction of bearing according to this invention as arranged for a hollow transmission shaft between a turbine rotor and the impeller of a compressor. In this drawing—

Figure 1:
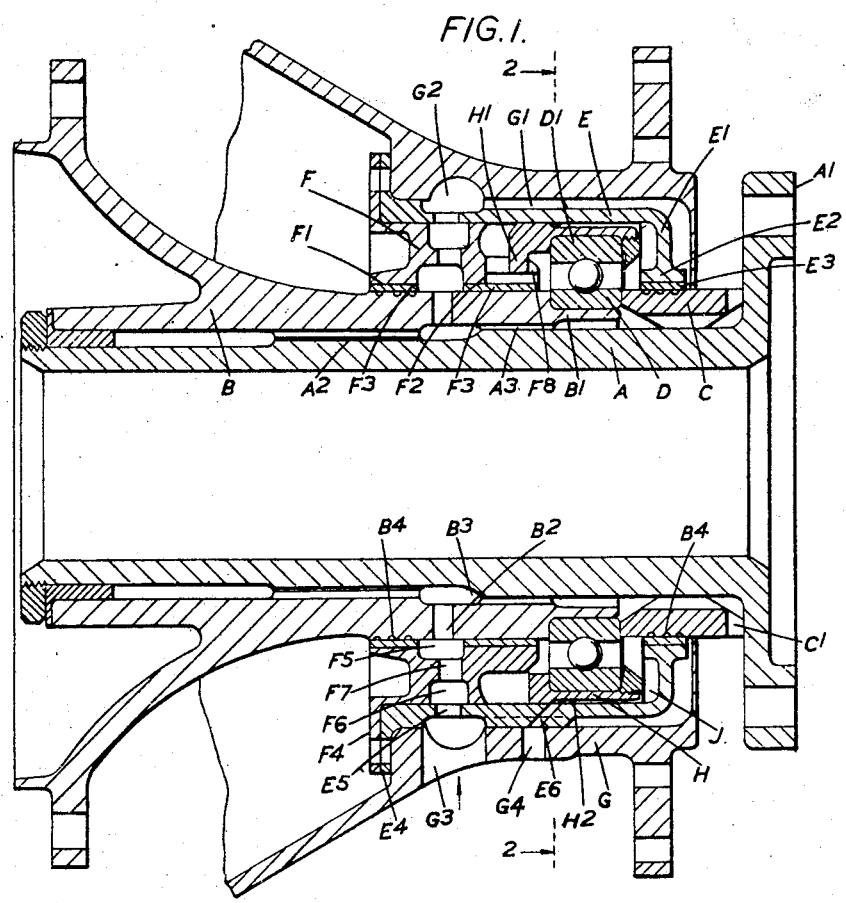
Figure 1 is a longitudinal sectional elevation.
Figure 2:
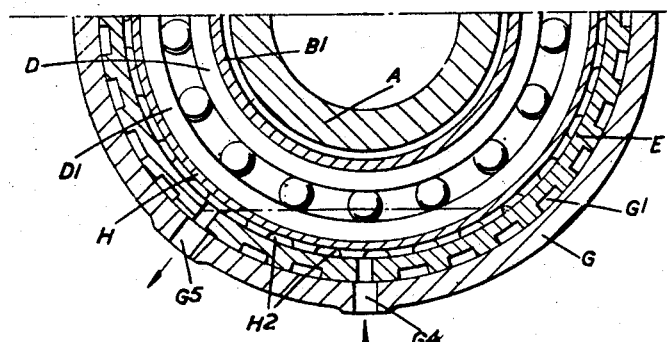
Figure 2 is a half transverse section on the line 2—2 in Figure 1.

The driving shaft A has at one end a flange $A^1$ through which it is connected to the turbine rotor. Surrounding the shaft is a sleeve B which is connected by splines $A^2$ to the shaft so that it will rotate therewith. These splines prevent the sleeve and shaft from being in contact throughout the length of the sleeve leaving clearances on either side of the splines. At $A^3$ is another spline formation which however does not serve as a positive connection between shaft A and sleeve B but while enabling these parts to be here in contact in a radial direction the formation provides longitudinal passages for cooling air. The end portion $B^1$ of this sleeve which lies towards the flange $A^1$ is reduced in diameter and thus forms with a separable end ring C an annular recess in which lies the inner race D of an anti-friction ball bearing. Outside the outer race $D^1$ of this bearing is a sleeve E at the end of which adjacent to the flange $A^1$ is an inwardly directed flange $E^1$ carrying a cylindrical part $E^2$ which constitutes one of the safety bearings. This part $E^2$ is faced with bearing material $E^3$ which closely encircles the outer surface of the ring C or other end portion of the sleeve B at one side of the anti-friction bearing $DD^1$, the latter being provided with oil retaining grooves. Within the opposite end of this outer sleeve E is an annular housing member F which internally is provided with cylindrical surfaces $F^1F^2$ which are spaced apart and each lined with bearing material $F^3$. These constitute the other safety bearings lying as they do on the side of the anti-friction bearing $DD^1$ remote from the safety bearing $E^3$ at the other end of the outer sleeve E. At its outer end the housing member F has an external flange $F^4$ which abuts against a corresponding flange $E^4$ on that end of the outer sleeve E and with that flange is bolted up to a part of an outer enclosing casing G. At an intermediate place in the length of the outer sleeve E there are splines which however merely provide radial contact between the sleeve E and the casing G with longitudinal passages for the flow of cooling air between these parts. In effect this arrangement constitutes an enlargement on the exterior of the sleeve E which lies in contact with and gets support from the interior of the outer casing. Longitudinal grooves $G^1$ are formed in this enlargement, as shown in Figure 2, which provide passages for the flow of air, the partitions between these passages resembling splines.

In a part of the outer casing G which lies outside the housing member F is an annular groove $G^2$ forming a passage into which cooling air is led through a radial opening $G^3$. Radial holes $E^5$ run through the part of the outer sleeve E which lies within the annular groove $G^2$ and within this part are inner and outer annular passages $F^5F^6$ in the housing member with communicating holes $F^7$ between them. Again inside this are radial holes $B^2$ through the shaft sleeve B leading into an annular space $B^3$ between the sleeve B and the shaft A. This annular space lies between the splines $A^2$, $A^3$. Longitudinal passages permit the air entering at $G^3$ and coming through the housing member F to flow along between the surface of the shaft A and the sleeve B around it, the air issuing at $C^1$ near the flange $A^1$. Air can also flow along outside the outer sleeve E and between it and the outer casing G and thus over the outside of the anti-friction bearing $DD^1$ and this air also issues near the flange $A^1$.

The outer race $D^1$ of the anti-friction bearing is carried in a tubular member H which externally fits and can slide longitudinally in the outer sleeve E, but cannot rotate since it is connected by a dog or the like $H^1$ with the adjacent end $F^8$ of the housing F. This member H has the effect of giving greater length in the axial direction to the outer race $D^1$ of the bearing and thus lessens the tendency for the bearing to tilt, while allowing it to slide. Arranged in this way the bearing can take radial loads but not thrust loads. The surfaces of the tubular member H which carries the outer race $D^1$ of the bearing and of the outer sleeve E which are in sliding contact may be copper-plated or otherwise treated to eliminate fretting.

A controlled amount of lubricant is supplied through a hole $G^4$ in the casing G and holes $E^6$ in the outer sleeve E to an annular space $H^2$ in the exterior of the tubular member H and the lubricant can flow thence by longitudinal slots to the space J at the end of the bearing and so into the bearing $DD^1$. Excess oil can escape by way of one or more holes $G^5$ through the outer casing G and passages through the outer sleeve E. The holes $G^5$ through which the oil can flow away are so positioned that they lie above a horizontal line below which the level of the oil in the bearing cannot fall, while at the same time the bearing cannot be flooded. To assist in preventing leakage of oil from the bearing there may be formed helical oil grooves $B^4$ in the surface of at least two of those parts of the sleeve B on which run the safety bearings $E^3F^3$.

What I claim as my invention and desire to secure by Letters Patent is:

1. A bearing for a power transmission shaft comprising in combination a shaft with means for connecting it at one end to a source of power and at the other end to a member to be driven by that source of power, an anti-friction bearing with its inner race mounted on the transmission shaft, a fixed casing enclosing the bearing, a non-rotating sleeve connected to the casing, a tubular member which lies within the said non-rotating sleeve by which it is supported, this tubular member carrying within it the outer race of the anti-friction bearing, a part at one end of the said non-rotating sleeve which lies at one side of the anti-friction bearing and closes the end of the sleeve having means provided with a bearing surface surrounding a surface rotatable with the transmission shaft thereby constituting a safety bearing, an annular housing which lies within the said non-rotating sleeve at the opposite side of the anti-friction bearing and is connected to the fixed casing, this housing being provided with at least one part which closes the end of the sleeve and has means provided with a bearing surface surrounding a second surface rotatable with the transmission shaft thereby constituting a second safety bearing, and means connecting the said housing and the said tubular member which means prevents rotation of that tubular member while permitting it and the bearing race within it to slide in the axial direction.

2. A bearing for a power transmission shaft comprising in combination a hollow shaft built up of two concentric parts connected together so as to transmit rotation from a source of power coupled to the inner shaft part to a driven member coupled to the outer shaft part, an anti-friction bearing with its inner race mounted on the said outer shaft part, a fixed casing enclosing the bearing, a non-rotating sleeve connected to the casing and having mounted within it the outer race of the said anti-friction bearing, a part at one end of this non-rotating sleeve which lies at one side of the anti-friction bearing and closes the end of the sleeve having means provided with a bearing surface surrounding a surface rotatable with the said outer shaft part thereby constituting a safety bearing, and an annular housing which lies within the said non-rotating sleeve at the opposite side of the anti-friction bearing and is connected to the fixed casing, this housing being provided with at least one part which closes the end of the sleeve and has means provided with a bearing surface surrounding a second surface rotatable with the said outer part of the transmission shaft thereby constituting a second safety bearing, said inner and outer shaft parts being spaced apart and said housing having an annular passage communicating with a radial passage in said outer shaft part whereby cooling air is conducted to said space.

3. A bearing for a power transmission shaft comprising in combination the features as set out in claim 2 wherein the outer surface of the inner part of the shaft is provided with an enlarged annular part where these shaft parts are in contact, one of said contacting shaft parts at said annular part having axial passages for the flow of cooling air.

4. A bearing for a power transmission shaft comprising in combination a hollow shaft built up of two concentric parts connected together so as to transmit rotation from a source of power coupled to the inner shaft part to a driven member coupled to the outer shaft part, an anti-friction bearing with its inner race mounted on the said outer shaft part, a fixed casing enclosing the bearing, a non-rotating sleeve connected to the casing, a tubular member which lies within the said non-rotating sleeve by which it is supported, this tubular member carrying within it the outer race of the anti-friction bearing, a part at one end of the said non-rotating sleeve which lies at one side of the anti-friction bearing and closes the end of the sleeve having means provided with a bearing surface surrounding a surface rotatable with the said outer shaft part thereby constituting a safety bearing, an annular housing which lies within the said non-rotating sleeve at the opposite side of the anti-friction bearing and is connected to the fixed casing, this housing being provided with at least one part which closes the end of the sleeve and has means provided with a bearing surface surrounding a second surface rotatable with the said outer part of the transmission shaft and thereby constitutes a second safety bearing, and means connecting the said housing and the said tubular member which means prevents rotation of that tubular member while permitting it and the bearing race within it to slide in the axial direction, said inner and outer shaft parts being spaced apart and said housing having an annular passage communicating with a radial passage in said outer shaft part whereby cooling air is conducted to said space.

5. A bearing for a power transmission shaft comprising in combination the features as set out in claim 4 wherein longitudinal passages are provided between the inner and outer parts of the shaft, and between the non-rotating sleeve and the fixed casing, with radial passages through the outer shaft part, the non-rotating sleeve and through the housing member between the non-rotating sleeve and the outer shaft part, said radial passages communicating with said longitudinal passages whereby cooling air can flow past the anti-friction bearing.

6. A bearing support for a power transmission shaft having means for attachment to a driving element and other means for attachment to a driven element, said support comprising an anti-friction bearing having an inner race adapted to be secured to the shaft and an outer race, a fixed casing surrounding said anti-friction bearing, a nonrotatable sleeve of greater axial length than said outer race, said sleeve being slidably mounted in said casing and enclosing said anti-friction bearing, the outer race of said anti-friction bearing being secured in said nonrotatable sleeve, a flange on said fixed casing carrying bearing means for engaging said shaft and positioned axially on one side of said anti-friction bearing, and a fixed annular housing secured to said casing and enclosed thereby, said annular housing having a bearing surface for engaging the shaft and positioned axially on the opposite side of said anti-friction bearing, said bearing means and bearing surface providing auxiliary bearings for said shaft at both sides of said anti-friction bearing operative upon failure of the latter to maintain said shaft in alignment whereby unequal expansion of said driving and driven elements is permitted and wobbling of said shaft is prevented.

7. In a bearing support according to claim 6, complementary inter-engaging means on said sleeve and said fixed annular housing holding said sleeve against rotation and providing for limited axial movement thereof with respect to said housing.

8. In a bearing support according to claim 7, an oil passage through said fixed casing and a communicating oil passage extending axially in said nonrotatable sleeve for conducting lubricant to said races and inter-engaging means.

FRANK BERNARD HALFORD.

REFERENCES CITED

The following references are of record in the file of this patent:

UNITED STATES PATENTS

| Number    | Name   | Date          |
|-----------|--------|---------------|
| 2,196,952 | Bogaty | Apr. 9, 1940  |
| 2,255,662 | Gulow  | Sept. 9, 1941 |
| 1,991,614 | Jonn   | Feb. 19, 1935 |
| 2,142,632 | Cox    | Jan. 3, 1939  |
| 1,255,378 | Beach  | Feb. 5, 1918  |

FOREIGN PATENTS

| Number  | Country | Date          |
|---------|---------|---------------|
| 558,016 | Germany | Aug. 31, 1932 |